(12) United States Patent
Helms

(10) Patent No.: US 6,590,498 B2
(45) Date of Patent: Jul. 8, 2003

(54) METHOD AND APPARATUS FOR IMPROVING THE INTERROGATION RANGE OF AN RF-TAG

(75) Inventor: Howard David Helms, Brookside, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 118 days.

(21) Appl. No.: 09/999,390

(22) Filed: Oct. 31, 2001

(65) Prior Publication Data

US 2002/0113709 A1 Aug. 22, 2002

Related U.S. Application Data

(63) Continuation-in-part of application No. 09/801,519, filed on Mar. 8, 2001, which is a continuation of application No. 09/421,867, filed on Oct. 19, 1999, now Pat. No. 6,236,315.

(51) Int. Cl.[7] ............................................. G08B 13/14
(52) U.S. Cl. ................. 340/572.7; 340/505; 340/573.1; 340/928; 343/720; 343/895; 343/866; 455/277.1; 455/41; 455/59; 455/62
(58) Field of Search ............................ 340/572.7, 505, 340/573.1, 928, 825.45, 825.54; 343/720, 895, 866; 455/277.1, 41, 59, 62

(56) References Cited

U.S. PATENT DOCUMENTS

| 5,649,296 A | * | 7/1997 | Maclellan et al. | ......... 455/38.2 |
| 6,243,013 B1 | * | 6/2001 | Duan et al. | ............... 340/572.7 |
| 6,289,209 B1 | * | 9/2001 | Wood, Jr. | ................ 455/277.1 |

* cited by examiner

Primary Examiner—Benjamin C. Lee
Assistant Examiner—Tai T. Nguyen
(74) Attorney, Agent, or Firm—Cohen, Pontani, Lieberman & Pavane

(57) ABSTRACT

A method for increasing the interrogation range of an RF Tag in a radio communication system using RF Tags with multiple reflecting antenna elements. The reflecting antenna elements are predeterminately positioned, and preferably aligned, with respect to each other in the direction of expected incident RF radiation. The reflecting antenna elements are sequentially pulsed on and off such that while the first reflecting antenna element is in a signal reflecting operating state, the remaining reflecting antenna elements are in a substantially non-reflecting state, and when the second reflecting element is in a reflecting operating state, the remaining reflecting elements are in a non-reflecting state, etc. The sequential pulsing and predetermined fixed spacing between the reflector elements generates constructive interference between the reflected signals of the reflecting antenna elements which increases the power of the resulting reflected signal.

27 Claims, 12 Drawing Sheets

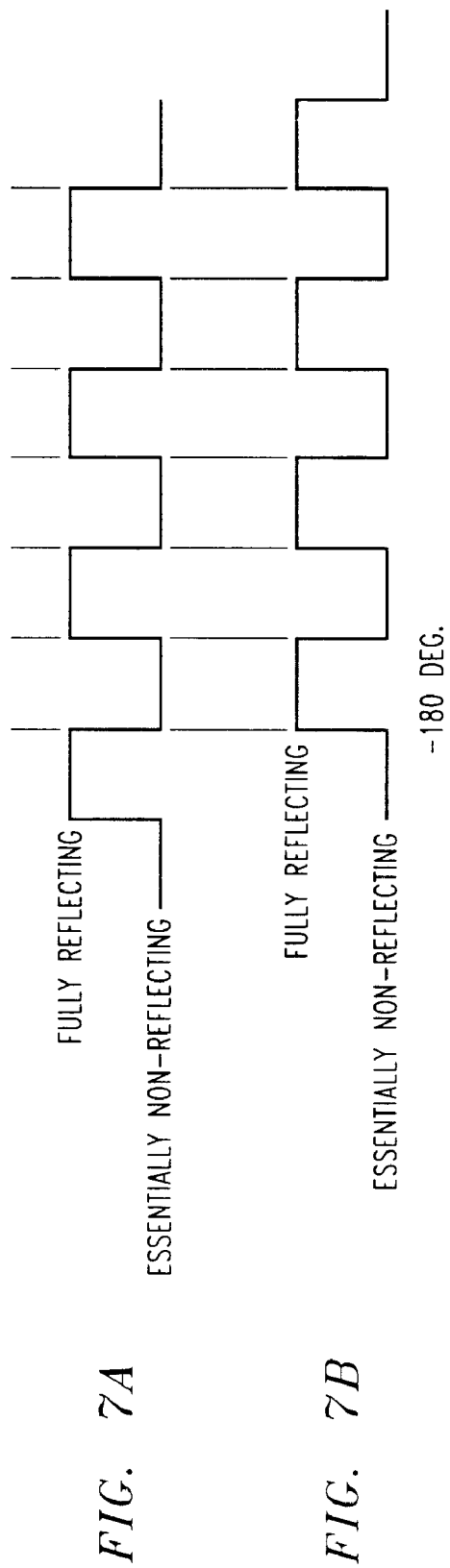

METHOD AND APPARATUS FOR IMPROVING THE INTERROGATION RANGE OF AN RF-TAG

RELATED APPLICATIONS

This application is a continuation-in-part application of application Ser. No. 09/801,519, which was filed on Mar. 8, 2001, which is a continuation of application Ser. No. 09/421,867, which was filed on Oct. 19, 1999 and which issued as U.S. Pat. No. 6,236,315 on May 25, 2001.

BACKGROUND OF THE INVENTION

1. Field of the Invention

The present invention relates to wireless communication systems and, more particularly, wireless communication systems using backscatter technology.

2. Description of the Related Art

RF Tag systems are radio communication systems that communicate between a radio transceiver, called an Interrogator, and a number of inexpensive devices denoted as Tags. In RF Tag systems, the Interrogator communicates to the Tags using modulated radio signals which activate any Tag in range or may activate a specific Tag within the range. After activating a Tag, the Interrogator may transmit information to it (this is called the Downlink). The Interrogator transmits a Continuous-Wave (CW) radio signal to the Tag; the Tag then modulates the CW signal using modulated backscattering (MBS) in which the Tag is electrically switched by the modulating signal, from being an absorber of RF radiation to a reflector of RF radiation. This modulated backscatter allows communications from the Tag back to the Interrogator (called the Uplink). The Downlink transmission of messages can include information relating to a desired operation of the RF Tag and, for example, the Interrogator is capable of instructing the RF Tag to turn on and/or off on demand. Modulated Backscatter (MBS) systems can be used to manage inventory or perform other useful monitoring application such as reading the state of a sensor.

The operation of an RF Tag system utilizing MBS is now described. In FIG. 1, there is shown an overall block diagram of an RF Tag system. An Application Processor 101 communicates over Local Area Network (LAN) 102 to a plurality of Interrogators 103–104. (Although commonly a plurality of Interrogators 103–104 connected by a LAN 102 to an Application Processor 101 are used, the inventions described herein are also capable of being configured with only a single Interrogator connected either to a LAN or directly to an Application Processor.) The Interrogators may then each communicate with one or more of the Tags 105a–107. For example and with further reference to FIG. 2, the Interrogator 103 receives an information signal, typically from Applications Processor 101. The Interrogator 103 takes this information signal and Processor 200 formats a Downlink message (Information Signal 200a) to be sent to the Tag. The information signal (200a) may include data information such as information specifying which Tag is to respond (each Tag may have fixed or programmed identification number), instructions for the Tag's processor to execute such as activation and deactivation, and/or any other information to be used and/or stored by the Tag's processor. With joint reference to FIGS. 1 and 2, Radio Signal Source 201 synthesizes a radio signal, Modulator 202 modulates the radio signal using Information Signal 200a, and Transmitter 203 transmits this modulated signal via Antenna 204, illustratively using amplitude modulation, to a Tag. Amplitude modulation is a desirable choice because the Tag can demodulate such a signal with a single, inexpensive nonlinear device (such as a diode). However, many modulation schemes are possible such for example, as Phase Shift Keying (PSK) of the subcarrier (e.g., BPSK, QPSK), more complex modulation schemes (e.g., MSK, GMSK), etc.

In the Tag 105a (see FIG. 3A), the reflecting antenna element 301a (e.g. a loop or patch antenna) receives the modulated signal. This signal is demodulated directly to baseband using the Detector/Modulator 302 which, illustratively, may be a single Schottky diode. The result of the diode detector is essentially a demodulation of the incoming signal directly to baseband. The Information Signal 200a is then amplified by Amplifier 303, and bit synchronization is recovered in Clock Recovery Circuit 304. Clock recovery circuits such as circuits that recover a clock from manchester encoded data are well known in the art. If large amounts of data are being transferred in frames, then frame synchronization may be implemented, as for example by detecting a predetermined bit pattern that indicates the start of a frame. The bit pattern may be detected by clock recovery circuit 304 or processor 305; bit pattern detection is well known in the art. The resulting information from clock recovery circuit 304 is sent to a Processor 305. Processor 305 is typically an inexpensive 4 or 8 bit microprocessor and its associated memory, and it generates an Information Signal 306 from Tag 105a back to the Interrogator (e.g., 103). Information Signal 306 is sent to Detector/Modulator 302 to modulate the RF signal received by Tag 105a to produce a modulated backscatter (i.e. reflected) signal. A Battery 310 or other power supply provides operating power to the circuitry of Tag 105a. Power may also be received, for example, by using inductive coupling or microwaves.

Returning to FIG. 2, the Interrogator 103 receives the reflected modulated signal through Receive Antenna 206, amplifies the signal in a Low Noise Amplifier 207, and demodulates the signal using homodyne detection in a Mixer 208. In an alternative embodiment, a single antenna may replace Transmit antenna (204) and Receive Antenna (206), in which case an electronic method of canceling the transmitted signal from that received by the receiver chain is required.

Using the same Radio Signal Source 201 as is used in the transmit chain means that the demodulation to baseband is done using homodyne detection; this has advantages in that it greatly reduces phase noise in the receiver circuits. The Mixer 208 then sends the Demodulated Signal 209 (if Mixer 208 is a Quadrature Mixer, it would send both I (in phase) and Q (quadrature) signals) to the Filter/Amplifier 210. The resulting filtered signal—typically an Information Signal 213 is sent to a Processor 200 to determine the content of the message.

Generally, RF Tags have a single reflecting antenna. Since the Tag only reflects RF energy instead of generating it, an RF Tag is less expensive to manufacture and requires little battery power when operating. Consequently, an RF Tag provides a low cost arrangement and method of transmitting sensor measurements to a central processing system or operator for evaluation.

The advantages of using RF Tags to transmit information to an Interrogator are accompanied by a disadvantage: since the RF Tag is only a reflector, the signals returned from it are generally weaker than in systems that generate RF energy at both ends of the communications link. For example, in an RF Tag system the signal-to-noise ratio (SNR) of a signal sent from the Tag falls off rapidly (proportionally to $r^{-4}$, where r is the distance between the transmitter and reflector). By comparison, in a communication system having a transmitter at one end and a receiver at the other, the SNR in each direction falls off slower (proportionally to $r^{-2}$) than in the RF Tag system. Thus, the interrogation range of the RF Tag is notably more limited by its distance from the RF transmitting source.

FIG. 4 depicts incoming RF radiation generated by RF Interrogator 103 and directed toward an RF Tag 105a having a reflecting antenna element 301a, and FIG. 5 shows the reflectance of the RF Tag 105a of FIG. 4. As is clear from FIG. 5, during operation the reflecting antenna 301a of RF Tag 105a is either in a fully reflecting mode or an essentially non-reflecting mode. For each full period T of the square wave depicted in FIG. 5, reflecting antenna 301a of RF Tag 105a is only in the fully reflecting mode for half of each period T.

SUMMARY OF THE INVENTION

The invention solves the above problems by providing multiple antenna elements positioned for reflecting expected incident radiation to an interrogator and spaced from each other such that the echo signal from each reflecting antenna element is out of phase with the other(s) to produce constructive interference of the reflected signal which is provided to the interrogator. The phase shifts can be achieved, for example, by spacing the reflecting antenna elements with respect to each other by a distance approximately equal to a fraction of the RF interrogating signal wavelength ($\lambda$) such that, for N reflectors, the spacing between adjacent reflectors will be approximately $\lambda/2N$. The reflecting antenna elements are then sequentially pulsed on and off in either of a forward or a reverse direction such that only one element is reflecting at any given time. The duration of each activation time of each reflector is approximately the period of the interrogating signal divided by the number of reflectors used, such that each reflector is energized for an equivalent time.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIG. 7A is a timing diagram of the reflectivity of a first reflecting antenna element shown in FIG. 6A;

FIG. 7B is a timing diagram of the reflectivity of a second reflecting antenna element shown in FIG. 6A;

FIG. 7C is a graphical representation of the phase of the reflected signals in accordance with an embodiment of the present invention;

DETAILED DESCRIPTION OF PREFERRED EMBODIMENTS

Figure 3A:
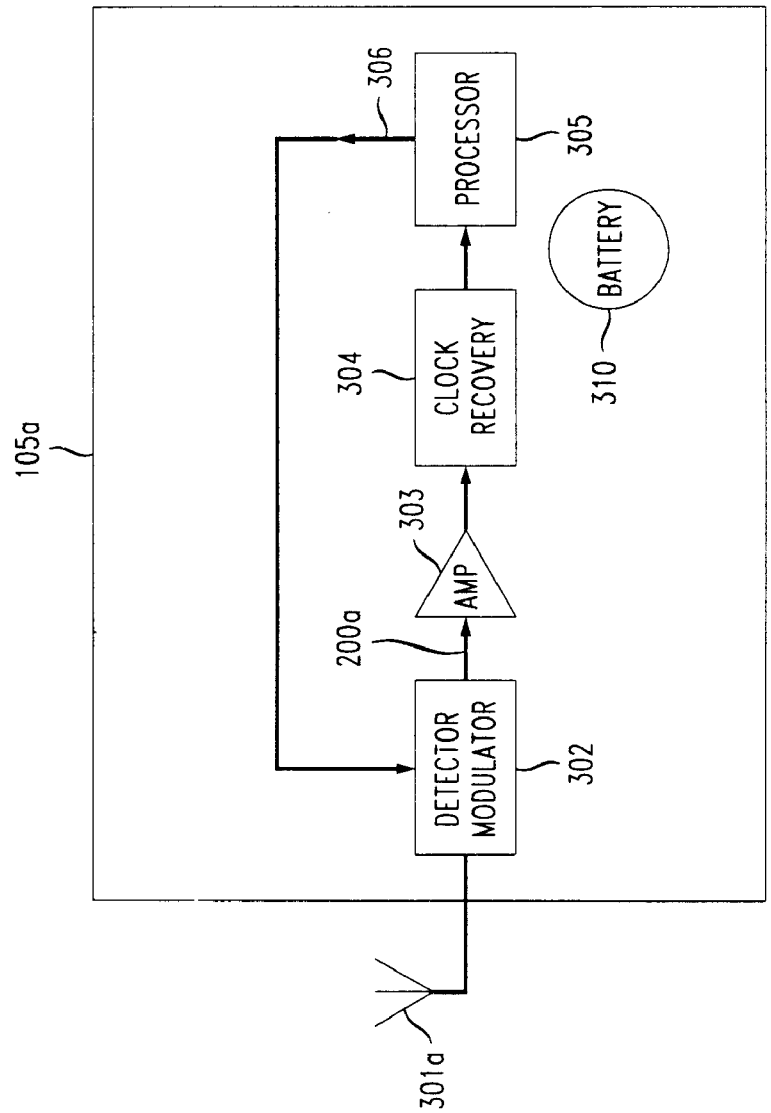
FIG. 3A is a block diagram of a prior art RF Tag used in the RFID system of FIG. 1.
Figure 3B:
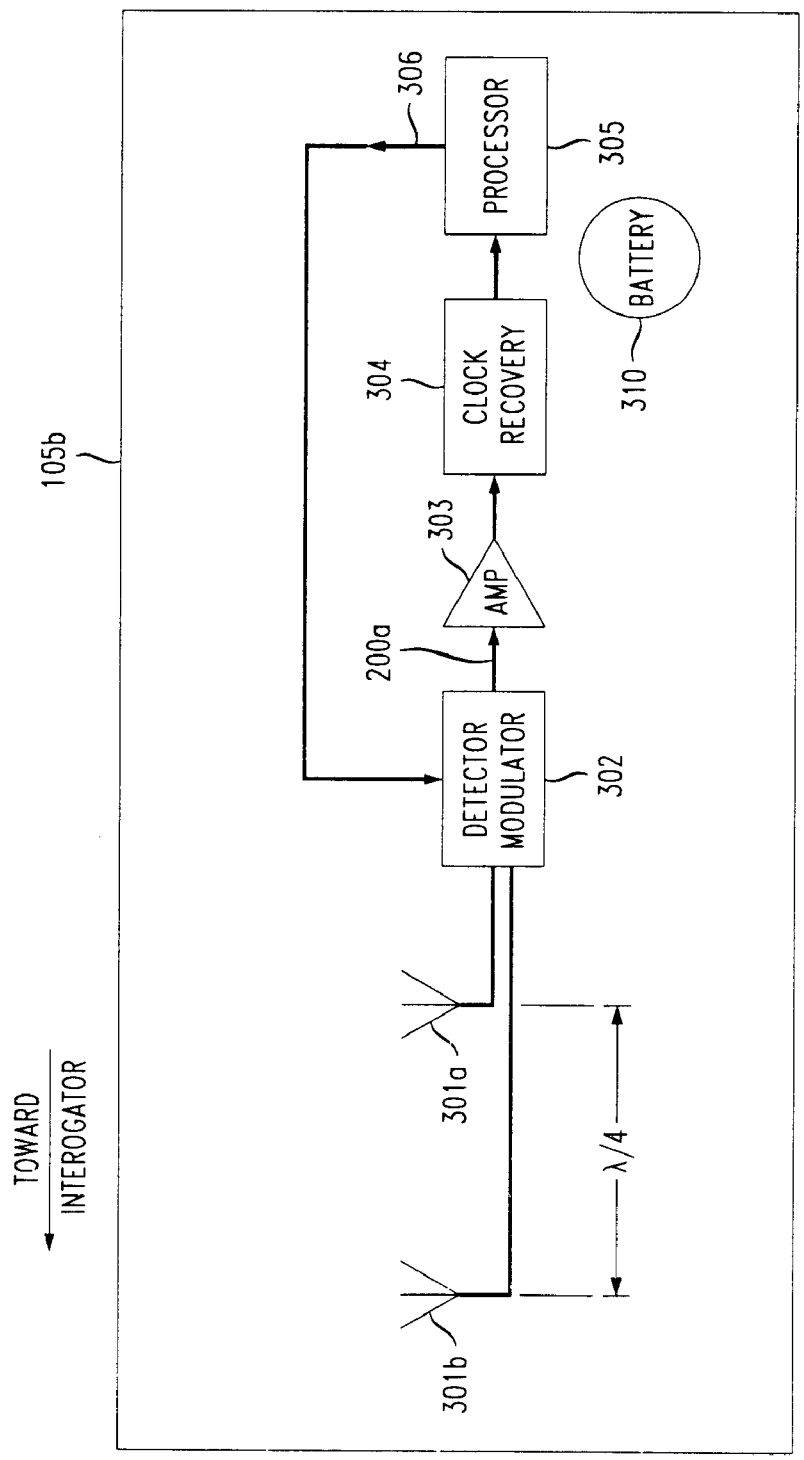
FIG. 3B is a block diagram of an RF Tag according to an embodiment of the present invention.
Figure 4:
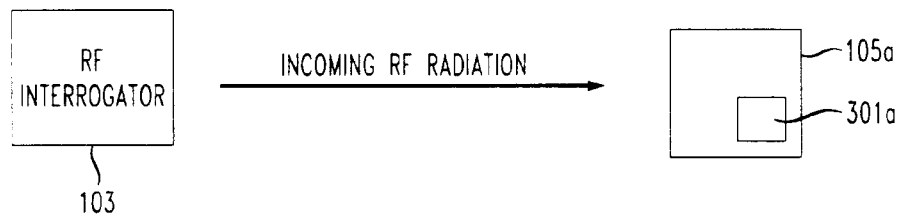
FIG. 4 is a block diagram representing a prior art reflecting antenna element (RF-Tag) system.
Figure 5:
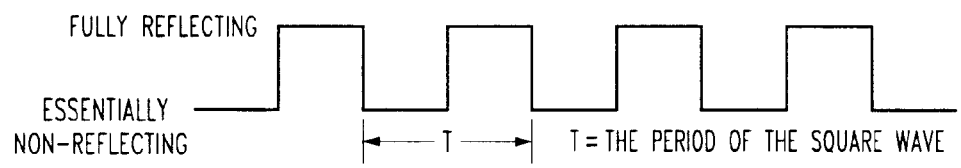
FIG. 5 is a prior art timing diagram of the reflectivity of the single reflecting antenna element of FIG. 1.
Figure 6A:
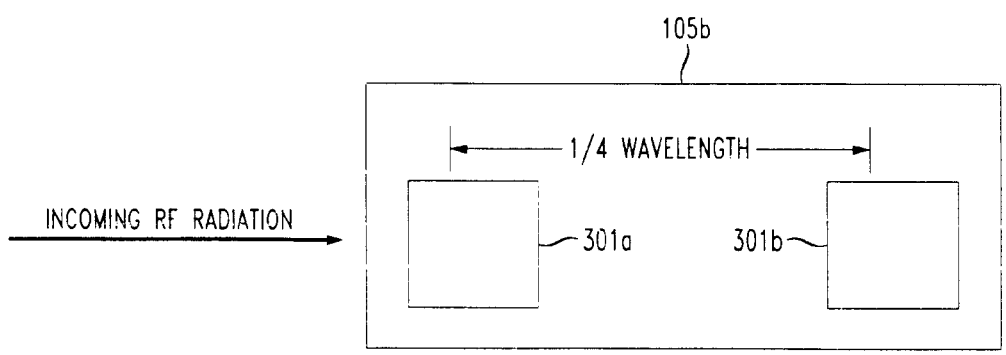
FIG. 6A is a block diagram of an RF Tag containing two reflecting antenna elements according to an embodiment of the present invention.

Referring now to FIGS. 3B and 6A, in accordance with an embodiment of the present invention an RF Tag 105b includes a first antenna (reflecting) element 301a and a second antenna (reflecting) element 301b predeterminately disposed with respect to the first reflecting element 301a such that the echo signal of second reflecting element 301b is preferably 180° out of phase with the echo signal generated by first reflecting element 301a. This phase relationship can be achieved by positioning the second reflecting element 301b a distance of approximately one-quarter wavelength ($\lambda/4$) from the first reflecting element 301a and then orienting the RF Tag so the axis of the two reflecting elements points towards the Interrogator. The axial alignment of the two reflecting elements in the direction of the expected incident radiation (i.e., the direction from which the Interrogator interrogates the RF Tag) is required to achieve the 180° phase relationship and therefore a constructive interference. When the axial alignment of the two antenna elements is changed for any reason resulting in a change in the phase relationship of the respective echo signals being reduced to less than 60°, the desired constructive interference becomes destructive and the performance gain is lost.

According to an embodiment of the present invention, the amount of phase difference between the echo signal of the second reflecting element 301b and the first reflecting element 301a can be in a range of 60°–180°. The preferred 180° out-of phase relationship between the two reflecting elements 301a and 301b can be obtained, for example, by positioning one reflecting element approximately 1/4 wavelength (of the interrogating signal) in front of the other in the direction from which the incident RF transmission is expected to arrive. Those of ordinary skill in the art will of course quickly recognize that this $\lambda/4$ spacing is only one exemplary arrangement among many geometries that can be used to achieve the desired phase relationship between the two reflected signals. For example, spacings of $3/4\lambda$, $5/4\lambda$, $7/4\lambda$ can also achieve the 180° out-of-phase relationship.

The two reflecting elements 301a and 301b (or sets of reflecting elements) are alternately pulsed on and off such that first reflecting element 301a enters a reflecting state when second reflecting element 301b enters a non-reflecting state, and vice versa. Care must be taken that both reflectors 301a and 301b are not simultaneously active because when both reflectors 301a and 301b are simultaneously active, and if both reflections are equally strong, the two reflected signals cancel each other out and provide no improvement in the interrogation range.

In the preferred embodiment, the alternate pulsing of reflecting elements 301a and 301b is activated by processor 305 as instructed by the RF Interrogator in its initial transmission to the reflecting elements 301a and 301b. A bit stream of information containing coded instructions for the RF Tags is sent to RF Tag 105b such that the processor 305 recognizes that it is being interrogated (e.g., by recognizing its ID code). As explained with reference to FIG. 1, the initial transmission of the Interrogator can provide control information to the RF Tags and, more particularly, enables the selective activation and deactivation thereof. After receiving any instructions from the Interrogator, the processor 305 places the RF Tag into its data read out mode. According to the present invention, processor 305 accomplishes this by switching the reflectivities of the reflector elements 301a and 301b alternately. The processor 305 can accomplish this by setting the control lead to reflecting element 301a to a logic one while setting the control lead of reflecting element 301b to logic zero, and vice versa.

In an alternative embodiment, processor 305 can be pre-programmed to generate a square wave that is capable of alternately pulsing on and off the respective first and second reflecting antenna elements 301a and 301b. In this embodiment, the RF tag 105b will usually be turned off, and upon receipt of the initial interrogating RF signal will be turned on. Once activated (i.e., turned on), the pre-programmed square wave will automatically generate the desired alternate pulsing of the reflecting antenna elements.

Once the alternate pulsing of the pair of reflecting antenna elements is established, the continuous wave (CW) transmission begins to cause RF Tag 105b to reflect information relating to the data set or data measurements stored in or sensed by the RF Tag. The alternate pulsing of reflecting elements 301a and 301b changes the phase of the reflected signal by 180° because the incident signal traverses a round-trip path that is a total of approximately one-half a wavelength longer (i.e. about twice the λ/4 spacing of the reflecting elements) than that of single reflector prior art systems. The change in phase of the reflected signal results in a 6 dB improvement in the signal-to-noise ratio (SNR) as compared with the single reflecting element configuration of FIG. 1, as shown in the mathematical analysis presented later. The 6 dB improvement can be achieved when the two reflecting elements 301a and 301b are spaced approximately 1/4 wavelength apart and reflect equally strongly in the direction of reflection. If this is not the case, an improvement that is less than a 6 dB will be achieved until the spacing becomes less than λ/12 in the direction of the incident signal, which would result in a configuration whose performance is worse than that of the single reflector of the prior art.

Figure 6B:
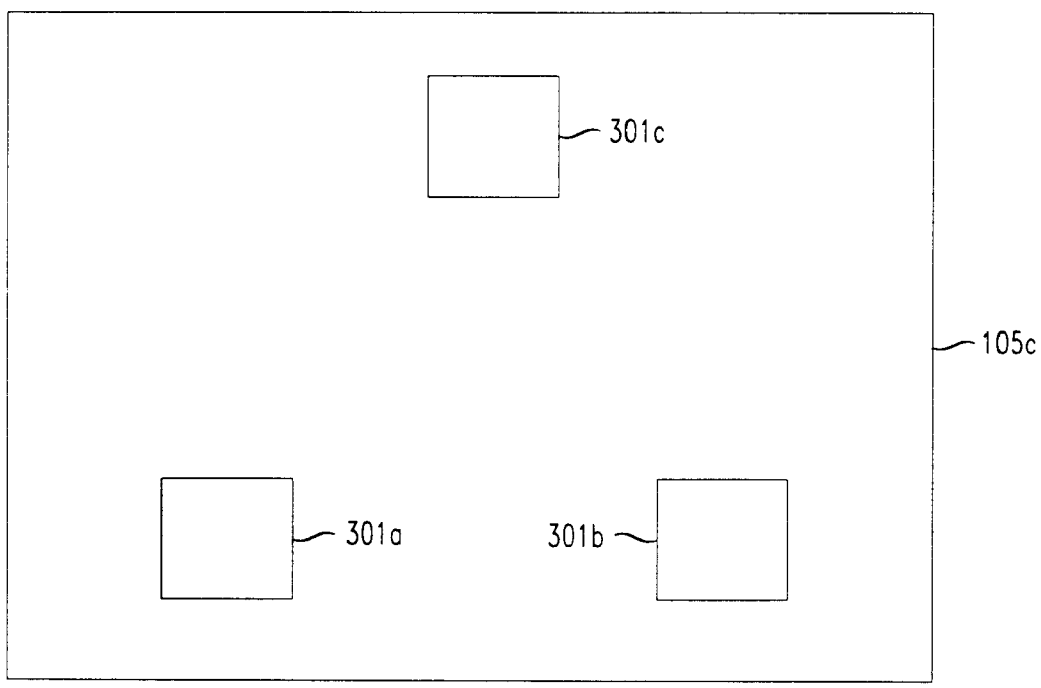
FIG. 6B is a block diagram of an RF Tag containing three reflecting antenna elements according to another embodiment of the present invention.

In accordance with one embodiment, reflecting elements 301a and 301b depicted in FIG. 6A are disposed on the same Tag. Accordingly, the reflecting elements 301a, 301b and 301c of FIG. 6B are embodied on a common tag, as are reflecting elements 301a, 301b, 310c and 301d of FIG. 6C. It is contemplated herein to include the added reflecting elements for increasing the interrogation range of the RF Tag separately from the RF Tag such that they can be added to an existing RF Tag without requiring modification of the same. In this embodiment, the added reflecting elements are also disposed in spaced relation with the single reflecting element of the RF Tag such that they are λ/4 apart in the direction of the expected incident radiation so as to achieve the desired 180° phase shift in reflected signals. As discussed, one of ordinary skill will quickly recognize that other embodiments can be included that achieve the same 180° phase shift without necessarily requiring the λ/4 spacing described.

FIG. 7A depicts the reflectance of the first reflecting element 301a and FIG. 7B depicts the reflectance of the second reflecting element 301b. As a result of the alternate pulsing, at any given time one of the two reflecting elements is in a fully reflecting mode and the other is in an essentially non-reflecting mode. A mathematical explanation of the applicability and enhancement of the present invention follows.

Mathematical Analysis for a Single Reflecting Antenna

Figure 1:
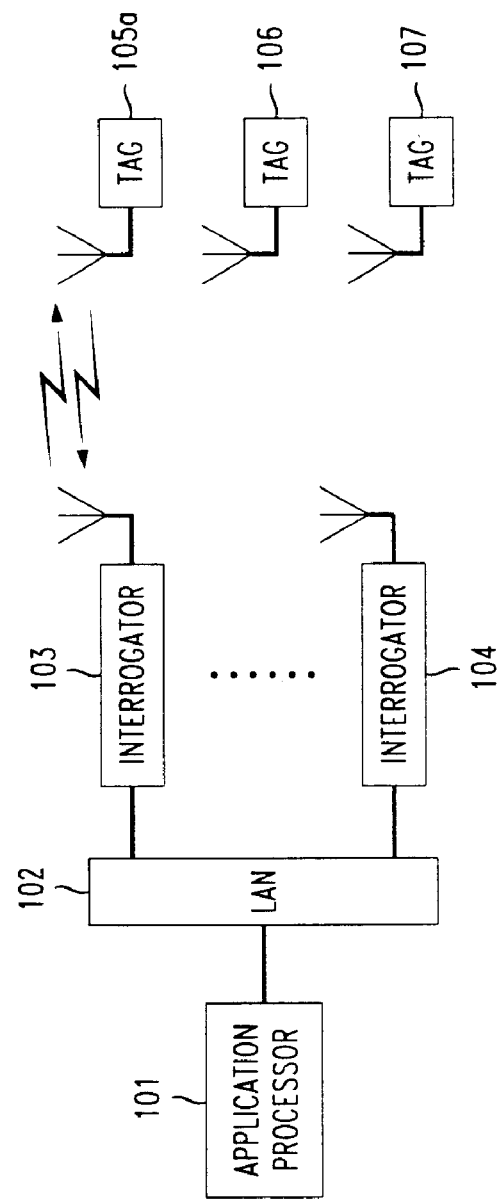
FIG. 1 is a block diagram of an illustrative prior art Radio Frequency Identification System (RFID ) to which the present invention is applicable.
Figure 2:
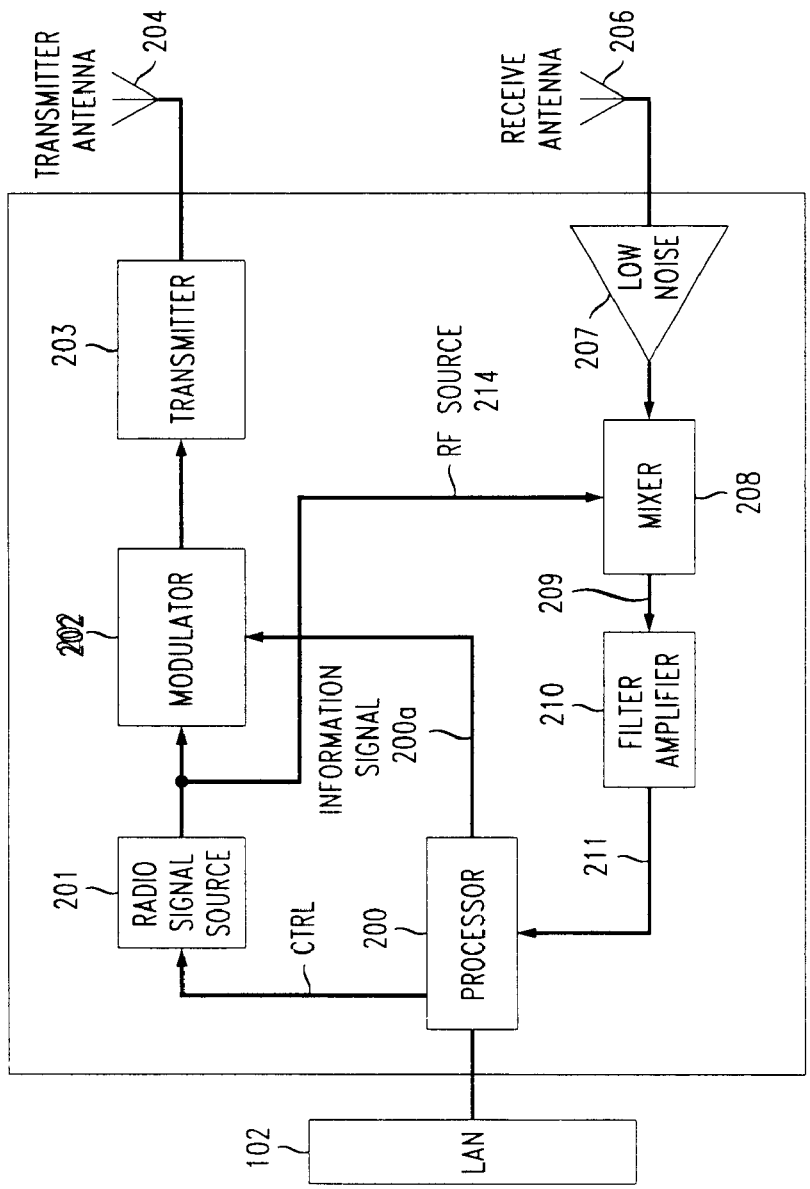
FIG. 2 is a block diagram of an illustrative prior art Interrogator used in the RF Tag system of FIG. 1.

When a single-reflector RF Tag is in its reflecting state, the reflected signal can be represented as a carrier sinusoid modulating (i.e. multiplying) the Fourier Series of the square wave in FIG. 1:

$$\text{reflected\_signal}_{Single-reflector} = F(t)\cos(\omega_c t) \quad (1)$$

where, in equation (1), $\omega_c$ is the RF carrier frequency in the sinusoid $\cos(\omega_c t)$ that is modulated (i.e., multiplied) by the Fourier Series $$F(t) = \frac{1}{2} + \frac{2}{\pi}\sin\left(\frac{2\pi t}{T}\right) + \frac{2}{3\pi}\sin\left(\frac{6\pi t}{T}\right) + \frac{2}{5\pi}\sin\left(\frac{10\pi t}{T}\right) + \cdots \quad (2)$$

of a square wave of period T that varies between 0 and 1 (neglecting scaling factors), with 1/T being the frequency of a subcarrier that can be modulated as described elsewhere in this application. The ellipsis ( . . . ) in equation (2) represents the higher-order terms of this series, which is shown for an ideal square wave. The coefficients of the Fourier Series for a less-than-ideal square wave will somewhat deviate from these coefficients to a degree, but such deviations will not change the results of the present analysis.

In the interrogator 103, the reflected signal picked up by the receive antenna 206 and amplified by the low-noise amplifier 207 is demodulated by the mixer 208 using the RF source 214 (homodyne detection). This demodulation eliminates the $\cos(\omega_c t)$ factor from equation (1). Consequently, the only surviving part of equation (1) in the signal presented to the filter-amplifier 210 is the Fourier series F(t). The filter-amplifier 210 is an AC-coupled low pass filter that suppresses direct current (DC) frequencies, passes frequencies around the carrier frequency $$\frac{1}{T} \text{ Hz,}$$

and blocks frequencies at and above its second harmonic frequency $$\frac{2}{T} \text{ Hz.}$$

(The use of AC coupling and low pass filtering is an inexpensive method of constructing a bandpass filter with a passband centered on the carrier frequency.) Consequently, to a first approximation, the only remaining term in the Fourier series F(t) is its fundamental (i.e. its subcarrier) frequency term, which in equation (2) is $$\text{filtered\_signal}_{\text{single\_reflector}} = \frac{2}{\pi}\sin\left(\frac{2\pi t}{T}\right) \quad (3)$$

The filtered signal can be further demodulated to extract information that was modulated onto it as described elsewhere.

Mathematical Analysis for Two Reflecting-Antennas

The square wave of reflection for the two-reflector system has twice the amplitude of the single-reflector system, because (i) the RF-Tag is reflecting constantly, and (ii) alternate reflections have a 180° phase difference. The following mathematical analysis shows this for the general case in which the phase angle of the reflections from the second reflecting-element 301b differ from those of first element 301a by ψ radians, so that the total signal reflected by both elements is $$\text{reflected\_signal}_{two\_reflector} = F(t)\cos \omega_c t + (1-F(t))(\cos(\omega_c t+\psi)) \quad (4)$$

where F(t) is the Fourier series defined in equation (2). It will be noted that 1−F(t) assumes the same two values (0 for no reflectance and 1 for full reflectance) as F(t) assumes, and also that 1−F(t) is 0 when F(t) is 1, and vice versa. Collecting terms and using the usual trigonometric identity for cos(ω_c t+ψ) produces the equivalent expression:

$$\text{reflected\_signal}_{two\_reflector} = \cos(\omega_c t+\psi) + F(t)((1-\cos(\psi))\cos(\omega_c t) + \sin(\psi)\sin(\omega_c t)) \quad (5)$$

After the reflected signal is received by the interrogator 103, the signal is demodulated by the mixer 208. This demodulation eliminates carrier-frequency factors such as cos(ω_c t+ψ), with the result that the signal presented to the filter-amplifier 210 can be represented as $$\text{demodulated\_signal}_{\text{two\_reflector}} = 2\left|\sin\left(\frac{\varphi}{2}\right)\right|F(t) \quad (6)$$

(This expression is obtained with the aid of standard trigonometric identities.) As in the single-reflector case, the filter-amplifier 210 eliminates all harmonics except the fundamental (i.e. subcarrier) frequency in the Fourier Series F(t) of equation (2):

$$\text{filtered\_signal}_{\text{two\_reflector}} = \frac{4}{\pi}\left|\sin\left(\frac{\varphi}{2}\right)\right|\sin\left(\frac{2\pi t}{T}\right) \quad (7)$$

If the two reflecting elements are separated by approximately 1/4 wavelength $$\left(\text{i.e. by } \frac{\lambda}{4}\right)$$

so that ψ=180", equation (7) reduces to equation (8)

$$\text{filtered\_signal}_{\text{two\_reflector}} = \frac{4}{\pi}\sin\left(\frac{2\pi t}{T}\right) \quad (8)$$

which as in the single-reflector case may be further demodulated to extract an information-bearing signal.

A comparison of equations (3) and (8) reveals that the signal reflected by the two-antenna configuration of FIG. 3B is twice as large as the reflected signal from the single reflector system of the prior art (FIG. 3A). This translates into a 6 dB enhancement or improvement in the signal-to-noise power ratio. Because of the re relationship discussed previously, this 6 dB improvement further translates into a 41% increase in the maximum interrogation range.

There is, however, a limitation on this improvement in the signal-to-noise ratio. The 6 dB improvement can be achieved when the two reflecting elements 301a and 301b are spaced approximately 1/4 wavelength apart and reflect equally strongly in the direction of reflection. If this is not the case, an improvement that is less than a 6 dB but greater than 0 dB will be achieved provided that the spacing is greater than λ/12 in the direction of the incident signal. If the spacing is less than λ/12 in the direction of the incident signal, the performance is worse than that of the single reflector of the prior art.

This can be shown mathematically by dividing equation (3) into equation (8), giving:

$$\text{ratio}_{\text{two-reflectors-to-one-reflector}} = 2\left|\sin\left(\frac{\varphi}{2}\right)\right| \quad (8)$$

If ψ=180°, the ratio is 2 (i.e. 6 dB), as stated previously. Equation (8) shows that two reflectors perform better than one reflector if the phase difference ψ is greater than 60°, which corresponds to a separation of approximately $$\frac{\lambda}{12}$$

(1/12 wavelength) between the reflecting elements. Conversely, two reflectors will perform worse than a single reflector if the phase difference ψ is less than 60°.

Figure 8:
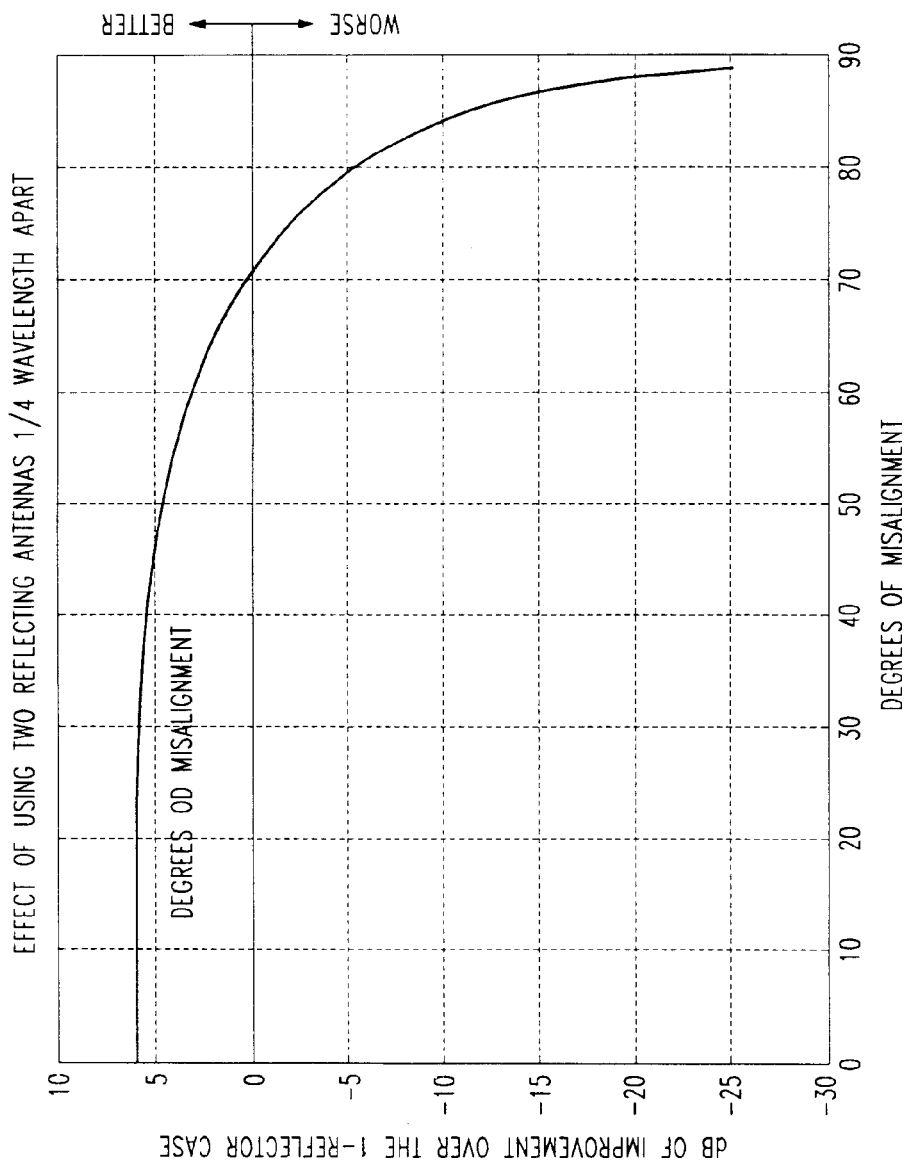
FIG. 8 is a graphical plot showing the signal level improvement provided by the reflecting antenna arrangement of the present invention.

Assuming that the two reflecting elements 105 and 120 are spaced approximately 1/4 wavelength apart (i.e. λ/4) so that ψ=180° precisely, the graph of FIG. 8 shows the variation in reflected signal as the angle between the axis of the two reflecting elements becomes mis-aligned with the direction of the incoming RF radiation. Specifically, this graph plots 20 log₁₀(2 sin(π/2 cos(θ)) in dB versus the misalignment angle θ in degrees. FIG. 8 implies that the two-reflector configuration is superior to the one-reflector configuration if the misalignment angle θ is less than 70°.

On the other hand, there are many situations in which an RF-Tag system can be oriented so that the two reflecting elements are positioned approximately 1/4 wavelength apart in the direction of reflection. For example, in a parking meter an RF-Tag can be positioned in a predictable orientation to an interrogation device with a directional antenna mounted in or on a vehicle driven past the parking meter.

Multiple Reflector Arrangements

In another embodiment, a reflective communicator having a group of N (N>1) reflectors are equally spaced along a line of between 1/4 and 1/2 wavelength. Each reflector is turned on (i.e. is put into its reflective state) periodically and sequentially for 1/N of the period of the sub-carrier. In this sequence, one reflector is turned on as its neighbor is turned off so that only one reflector is turned on at any given time. In this embodiment, the reflectors at each end of the line are considered neighbors.

Figure 9:
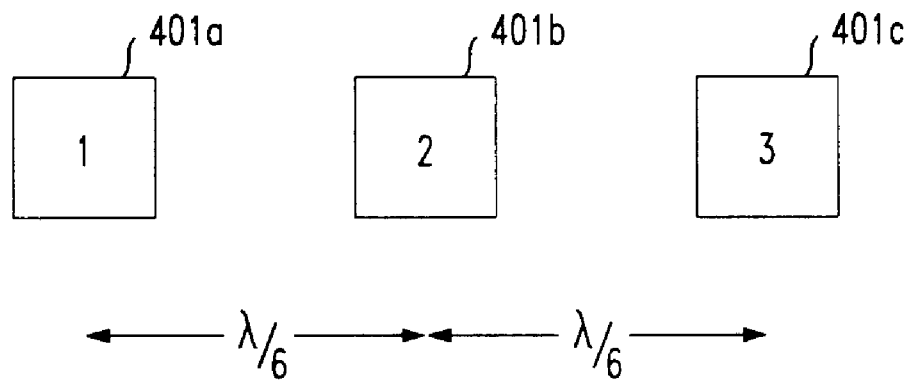
FIG. 9 diagrammatically depicts a three reflector arrangement in accordance with the present invention.

The case of N=2, in which the spacing between reflectors is approximately 1/4 wavelength and wherein each reflector is alternately activated so that the reflected signal changes by approximately 180 degrees, has been discussed above. As illustrated in FIG. 9 for N=3, the average spacing between the first two and the last two pairs of reflectors is λ/2N (where λ denotes the wavelength). Thus, for N=3, the average spacing between adjacent reflectors is ($\lambda/6$). If the reflectors are labeled 1, 2, 3 as in FIG. 9, each of the reflectors is activated or pulsed for an average time of 1/N (in this case 1/3) of the sub-carrier period in the sequence 1,2,3,1,2,3 . . . etc. as the reflectors are activated in a direction of activation, i.e. reflector 1, then reflector 2, then reflector 3, etc. As each reflector turns on, the phase of the reflected wave decreases by 120°. For example, as received by the interrogating source, the wave reflected from the line of reflectors is of some phase, which we arbitrarily assume to be 0° when returned from the 1$^{st}$ reflector. As a reflector is turned off and its neighbor is turned on, the phase received by the interrogating source will assume the approximate values −120°, −240°, −360°, 0°, −120° . . . etc. as the 2$^{nd}$, 3$^{rd}$, 1$^{st}$, 2$^{nd}$ . . . etc. reflectors are preferred that only one reflector be activated at any given time to realize maximum constructive interference, sufficient constructive interference may be present under certain circumstances when more that one reflector is activated at any given time.

Alternatively, the reflectors can be pulsed in reverse order, i.e. in the sequence 3,2,1,3,2,1, . . . etc., (which is a different or opposite direction of activation relative to the direction of activation discussed above), so that the phase received by the interrogating source will assume the approximate values 120°, 240°, 360°, 0°, 120° . . . etc.

It is pointed out that not every reflector in a plurality need be activated as the reflectors are accessed in a particular activation direction. Thus, for example, when a plurality of ten reflectors are provided, alternating activation may produce sufficient constructive interference such as by activating reflectors 1, 3, 5, 7, 9, etc. or in a reverse or different activation direction, i.e. reflectors 10, 8, 6, 4, 2, etc. In either case it should be recognized that the number (N) of reflectors is the activated number (e.g. N=5) are not the physical number (N=10). It should also be recognized that, as in the embodiment of FIGS. 3B and 6A, the activating means is preferably a processor that activates the select reflectors according to an instruction received by the Interrogator.

Table 1 shows the approximate spacing between adjacent reflectors for N=2 to N=6. This table also shows how much the increase or decrease of the phase of the reflected waveform as a reflector turns off and its neighbor turns on.

TABLE 1

Approximate spacing between adjacent reflectors

| No. of reflectors (N) | Approximate spacing between adjacent reflectors (in wavelengths) | Phase increase or decrease (in degrees) |
|---|---|---|
| 2 | $\lambda/4$ | 180° |
| 3 | $\lambda/6$ | 120° |
| 4 | $\lambda/8$ | 90° |
| 5 | $\lambda/10$ | 72° |
| 6 | $\lambda/12$ | 60° |
| N | $\lambda/(2N)$ | 360°/N |

Limit when the Number of Reflectors is Indefinitely Large

Figure 10:
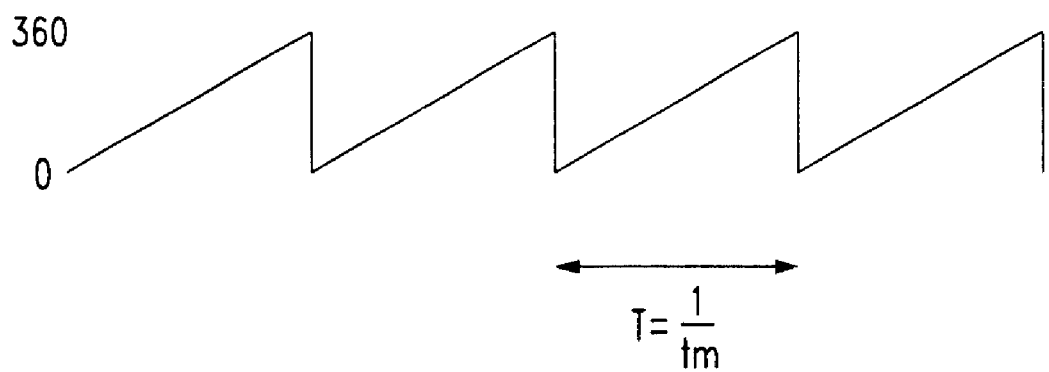
FIG. 10 graphically depicts a linear relationship of the phase of the reflected signal for a large number of reflectors.

Even though impossible to construct, it is instructive to consider the case in which N is indefinitely large (i.e., N→∞). In this case, the phase of the reflected wave can be depicted as a sawtooth waveform that varies periodically between 0 and 360 degrees, as illustrated in FIG. 10. This activity causes a frequency shift in the reflected waveform, as indicated by the following equation:

$$\text{reflected\_waveform} \approx \cos(2\pi(f_c \pm f_m)t) \quad (9)$$

with $f_c$ and $f_m$ representing the carrier and sub-carrier frequencies, respectively. The sign of $f_m$ depends on the direction of the sequence (i.e., negative for front to back and positive for back to front). This equation is constructed under the assumption that all reflecting reflectors reflect with equal strength. Another potential source of inaccuracy in this equation is that it ignores the interval $$\frac{1}{2f_c}$$

when the waveform either is not reflected at all or is reflected from two reflectors simultaneously, depending on whether the reflection-sequence moves from front to back or back to front. This neglect is possible because the period $$T_c = \frac{1}{f_c}$$

is much smaller than the period $$T = \frac{1}{f_m}.$$

The equation also neglects the well-known Gibbs oscillation at the discontinuity, which is insignificant because the mathematical (e.g. Lebesgue) measure of this oscillation approaches 0 as N→∞.

Figure 11:
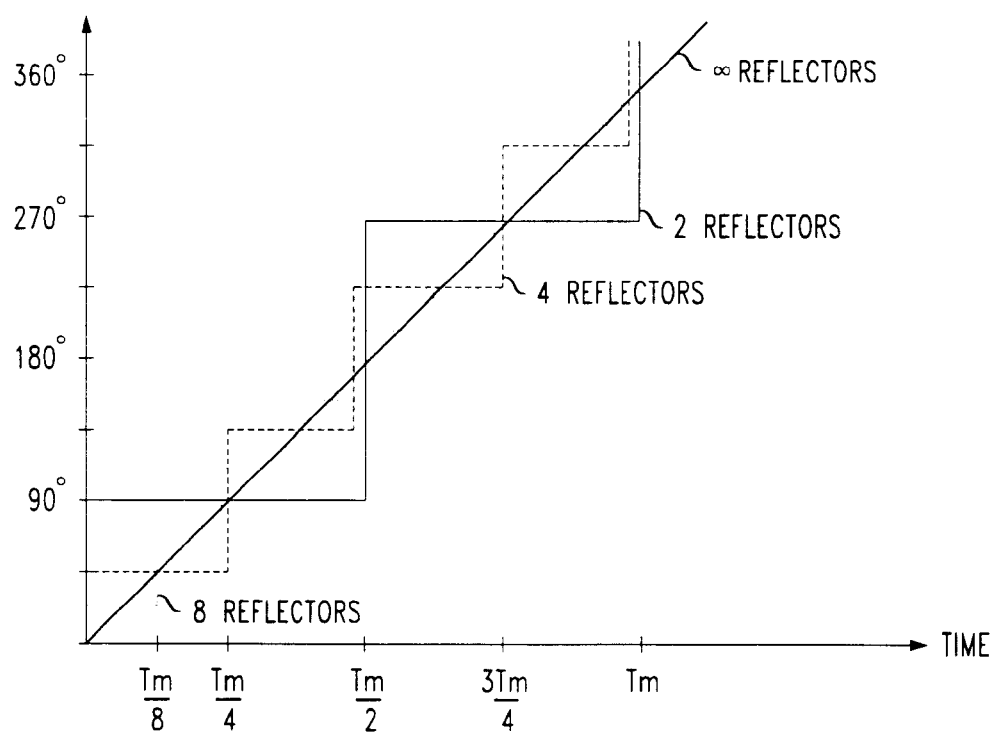
FIG. 11 is a graphical depiction of the phase of the reflected signal for two, four, eight and infinite reflectors, respectively.

The reason why the N→∞ case is instructive is apparent from FIG. 11, which shows the phases returned where N=2, 4, and 8 reflectors. This figure demonstrates that the phases returned by a line of reflectors approximate the N→∞ case with increasing accuracy as the value of N increases.

The improvement with increasing N is apparent in Table 2 which, for N>1, contains maximum values of the improvement factor $$20 \log_{10}\left(N \sin\left(\frac{\pi}{N}\right)\right) \text{ dB}.$$

This table also indicates the improvement in range calculated from $$\sqrt{N \sin\left(\frac{\pi}{N}\right)},$$

which is obtained by squaring the argument (to obtain the power) and then taking the 4$^{th}$ root of the result (to reflect the radar-relation $$\frac{1}{R^4},$$

where R is the range of the target).

TABLE 2

Power and range as a function of N

| N | Power ratio (dB) | Range increase (%) |
|---|---|---|
| 1 | 0 | 0 |
| 2 | 6 | 41 |
| 3 | 8.29 | 61 |
| 4 | 9.03 | 68 |
| 5 | 9.36 | 71 |

TABLE 2-continued

Power and range as a function of N

| N | Power ratio (dB) | Range increase (%) |
|---|---|---|
| 6 | 9.54 | 73 |
| ∞ | 9.94 | 77 |

Coping with Large Misalignment Angles
Single Reflector Pair

The simplest method of coping with a misalignment angle θ greater than 70° for a single reflector pair is simply to pulse both reflecting antenna elements 301a and 301b on and off together simultaneously, so that both are on or off at the same time. This causes the reflections from both elements to add together constructively, with the result that the reflected signal is enhanced from 3.5 dB to 6 dB above the single-reflector prior-art embodiment of FIG. 3A.

A strategy for utilizing this is for both reflecting antenna elements 301a and 301b to pulse first alternately on and off, followed by pulsing both on and off simultaneously for an equally long interval. A message would be modulated onto the subcarrier in duplicate, i.e. once in the first interval, and again in the second interval. If Interrogator 103 receives both copies of the message, it would simply discard the duplicate message.

An alternative strategy is for the Interrogator 103 to pick up the pulsed reflections from the first and second intervals and to identify the interval that generated the strongest reflection. The Interrogator will send a message to the Processor 305 of the RF Tag designating the stronger interval, so that the Processor 305 can use the appropriate mode (i.e. alternating or simultaneous pulsing) to send the message(s) to the Interrogator 103.

Multiple Reflector Pairs

Figure 12:
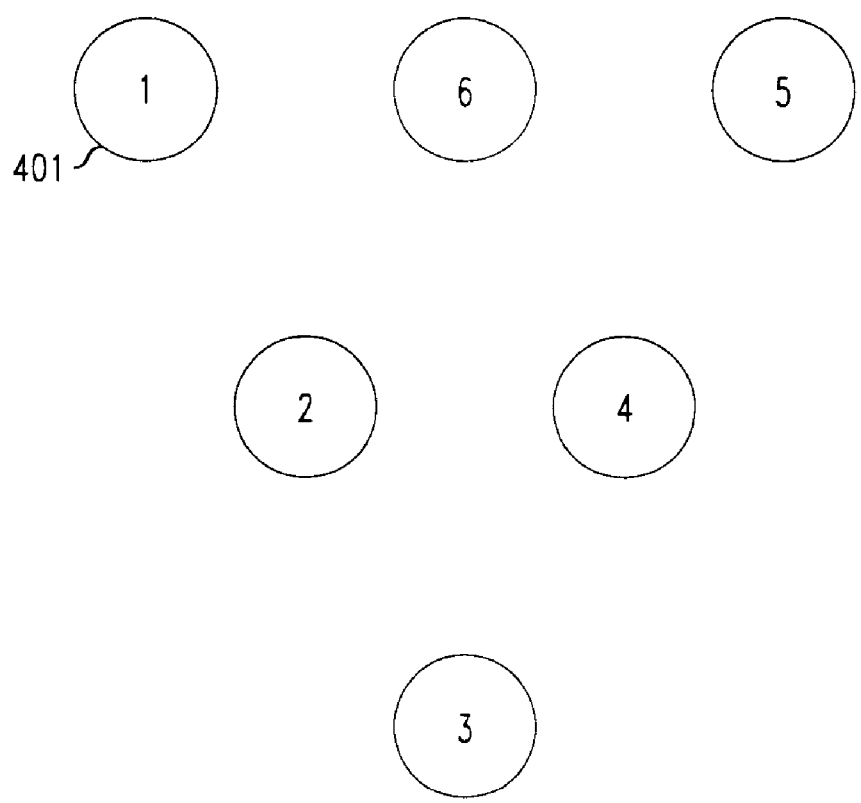
FIG. 12 depicts a 3-line arrangement of reflectors having common end reflectors.

Likewise, multiple reflectors can be arranged in a cross, or a triangle (N=3) as shown in FIG. 12, wherein the reflectors in each line are simultaneously energized to obtain the best constructive interference at the interrogator. In this configuration, the reflectors located at the corner positions, e.g., reflectors 1, 3, 5 in FIG. 12, are shared by adjacent reflector lines such that reflectors 1, 2, 3 are energized, followed by reflectors 3, 4, 5, followed by reflectors 5, 6, 1. Activation in the opposite direction is also possible.

Multiple reflector functionality can also be realized by using a Luneberg lens, as discussed below, in which two, three or more concentric shells of reflectors spaced as in Table 1 can be used to obtain the improvement factors shown in Table 2.

Compensation for Misalignment

Figure 13A:
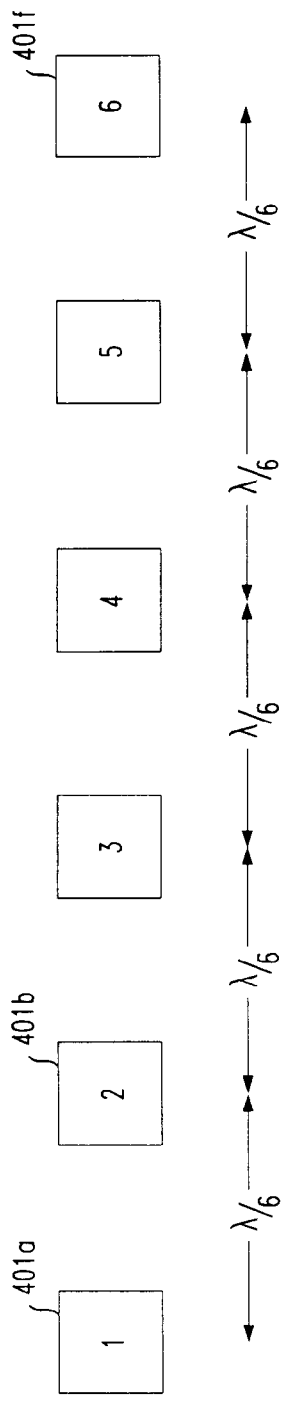
FIGS. 13A and 13B diagrammatically depict linear and staggered reflector arrangements, respectively.

Compensation for misalignment between a line of reflectors and an interrogator signal can be realized by increasing the length of the reflector line with the addition of additional reflectors, and activating each reflector in the so-increased line for a shorter duration, so that the total activation period is the same as for the original (e.g., prior to increase) number of reflectors. For example, the line of three reflectors of FIG. 9 can be doubled to six reflectors as shown in FIG. 13A, with the spacing between adjacent reflectors being substantially the same as that of FIG. 9, i.e. λ/6, so that the reflector line length of FIG. 13A is double the line length of FIG. 9. If the line of six reflectors were tilted 60° toward the direction of the incoming radiation from the interrogator, the projection of the line in the direction of the incoming radiation from the interrogator would be nearly the same as if the three reflector line in FIG. 9 were aligned to the direction of the incoming radiation from the interrogator. For this orientation, the six reflectors in FIG. 13A would be cycled at the same period T as used for the three reflector arrangement of FIG. 9 (e.g. each reflector is activated for T/6 as opposed to T/3 in FIG. 9, where T is the modulation period during which all reflectors are activated, so that each individual reflector is turned on half as long as in FIG. 9. Consequently, the phase of the reflected waveform would change by 60° (instead of 360°) whenever one reflector is turned on after its neighbor is turned off, so that the phase of the reflected wave will vary from 0° to ±360° in steps of ±60°. If the antenna pattern of each reflector were nearly omnidirectional, so that its reflection were as strong at 60° off-axis as it is on-axis, the tilted line of FIG. 13A would reflect more strongly than the FIG. 9 line would reflect on-axis (e.g. perfect alignment with the interrogator signal).

To use an elongated line of reflectors if the incoming radiation is aligned an unknown amount, the following strategy can be used: Initially only two adjacent reflectors are used for a fixed interval of time, with each reflector turning on for half of the modulation period T. Then three adjacent reflectors are used, with each reflector turned on ⅓ of the time of the modulation period T. Next four, five, and finally all six reflectors are used while cycling through the reflectors at the same period T.

With foreknowledge of this pattern, the interrogator could determine which number of reflectors gave the strongest reflection and send a signal to the computer controlling the line of reflectors to use the best returned signal.

Figure 13B:
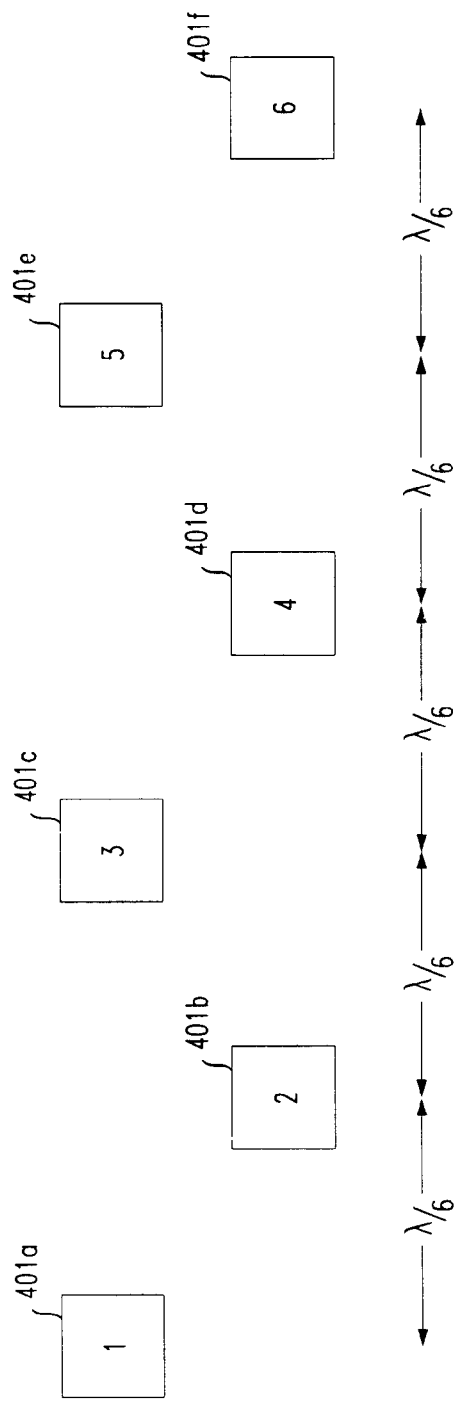

The phrase "line of reflectors", as used herein, is meant to be interpreted liberally. For example, it may be more practical in a particular situation to stagger alternate reflectors around a line or axis "x", as in FIG. 13B. If the direction of the interrogating signal is along the axis, then this orientation provides results as good as those of the arrangement of FIG. 13A.

By use of the invention disclosed herein, an improvement in the strength of the signal received at the interrogator is provided which, in turn, causes an increase in the range at which the RF tag can be interrogated. Another benefit lies in the ability of these techniques to compensate for misalignment between the direction of the interrogating RF and the axis of the reflector positions on the RF tag.

If the orientation of the line of reflectors is totally unknown (e.g. the line of reflectors could be in any orientation whatsoever), then either of two strategies can be used:

(1) the direction of cycling of the elements can be reversed, so that the pattern of "on" reflectors moves in the opposite direction. For example, instead of activating the reflectors in sequence in a first or forward direction, this pattern can be repeated in the opposite direction; or (2) the direction of cycling of the reflectors can be maintained in the same direction, with this same pattern then repeated. During the repetition, the interrogator's receiver can be tuned to the other possible frequency. For example, if the receiver were initially tuned to the upper sideband $f_c+f_m$, it could be retuned to the lower sideband $f_c-f_m$.

Where the interrogating equipment must maintain a connection with the RF tags over an interval of time during which the angle between the line of reflectors and the direction of the interrogator can be expected to vary substantially, an RF tag can cope with this by varying the number of reflectors used. For example, if five of six reflectors initially produce the strongest reflection, the interrogator could occasionally command the RF tag to try four and six reflectors to determine which number produces the best results.

If the orientation of the axis of the reflecting antenna elements cannot always be aligned with the direction of reflection, multiple reflectors can be used advantageously. For example, a parking-meter reader on foot might approach a parking meter bearing an RF-Tag from many possible different directions. In this case, a planar configuration of reflecting antenna elements on the parking meter will be appropriate provided that the plane is mounted parallel to the ground. FIG. 6B shows a block diagram of RF tag 105c having three reflecting antenna elements 301a, 301b and 301c arranged in a triangular array. In this embodiment, once the RF Tag receives the initial interrogating RF signal, the processor 305 would be pre-programmed to make the three elements 301a, 301b and 301c pulse alternately in pairs—first elements 301a and 301b, then 301b and 301c, and finally 301c and 301a for predetermined intervals of time. This can also be accomplished with the reflector arrangement of FIG. 12 except that one reflector line (e.g., reflectors 1, 2, 3, etc.) will be pulsed at any given time. If the message to be returned from the RF tag 105c is sufficiently short, the tag will simply send the message three times by modulating the pulses from each of the three reflector groups. If the Interrogator 103 receives a signal reflected from at least one of the groups, the Interrogator 103 will demodulate that signal to obtain the message, which can be validated with the aid of an error-detecting code. Should the Interrogator 103 receive more than one valid copy of the message, it will discard the duplicate message(s).

If the message to be sent is too lengthy to be transmitted in triplicate, each of the three groups will sequentially produce a short burst of message-free pulsing. The Interrogator 103 will pick up the pulsed reflections from the three groups and will identify the group that generated the strongest reflection. The Interrogator will then send a message to the Processor 305 of the RF Tag, designating the group that produced the strongest reflection so that the Processor 305 can direct that group to send the message to Interrogator 103.

Figure 6C:
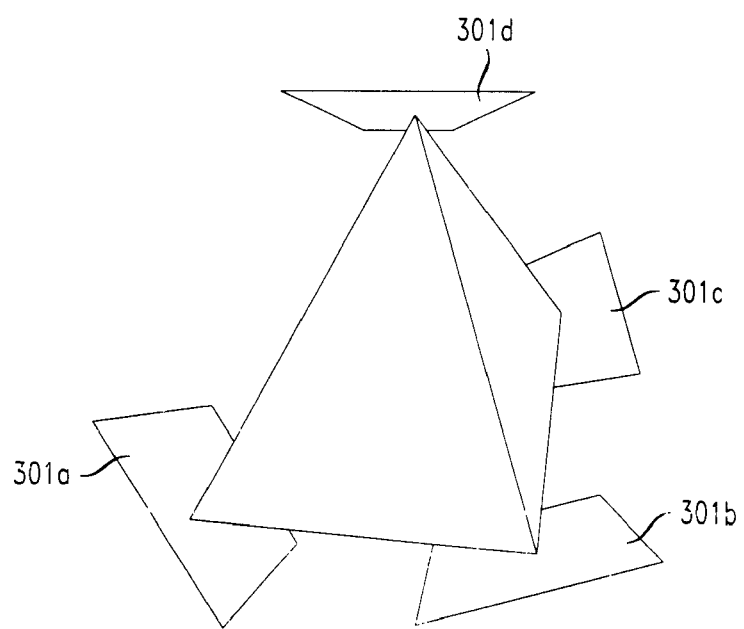
FIG. 6C is a block diagram of an RF Tag containing four reflecting antenna elements according to yet another embodiment of the present invention.

To deal with situations in which the direction of reflection can be at any angle whatsoever with respect to the RF tag, FIG. 6C depicts another embodiment of the present invention that utilizes four reflecting antenna elements 301a, 301b, 301c and 301d arranged in a tetrahedral type configuration. (Similar arrangements, such as mounting the reflecting antenna elements flush with the faces of a tetrahedron or other pyramidal structure, can be implemented more conventionally but are not as easy to illustrate.) Similar to the embodiment of FIG. 6B, elements 301a–301d will be alternately pulsed in pairs, and the pair that delivers the strongest reflection will be used by the system. For example, element pairs 301a and 301b, 301b and 301c, 301c and 301d, 301d and 301a, 301a and 301c, and 301b and will each be alternately pulsed for a predetermined time interval. As in the three-element embodiment described above, a short message can be resent in sextuplicate, once by each pair.

If the message is too long for such repetition, then each of these six pairs will sequentially produce a short burst of message-free pulsing. After identifying the pair producing the strongest reflection, the Interrogator will send a message to the Processor 305 of the RF Tag designating that pair, so that the Processor 305 can thereafter direct that pair to send the message to the Interrogator 103.

Luneberg Lens

A Luneberg lens generalization of the multiple-element approach of the previous section is capable of providing almost perfect resistance to misalignment of the element axis with the direction of reflection. U.S. Pat. No. 3,703,723, titled Portable Passive Reflector, of Victor Albanese et. al. and incorporated herein by reference, describes a Luneberg lens system in which a reflecting net is positioned on one side of a spherical lens (which is sometimes implemented as a hemisphere with a reflecting bottom). The reflectivity of this net is pulsed on and off in a manner similar to the antenna element of a conventional RF Tag. The benefits of using a Luneberg lens include 1) an increase in the SNR by increasing the radar cross-section of the lens, and 2) provision of a very wide range of angles (with respect to the direction of the incoming RF radiation) over which the lens will function.

Methods of fabricating a Luneberg-like lens are described in U.S. Pat. No. 2,866,971 of Kenneth S. Kelleher, also incorporated herein by reference. The lens of the '971 patent is spherical having void dielectric and density correction. The density of the dielectric material forming the spherical lens is changed by reducing the dielectric structure by removal of the dielectric material, thereby leaving voids in the dielectric structure. The spherical lens is assembled by stacking circular plates of the void-containing dielectric material where the plates vary in diameter from a maximum in the middle of the structure toward each end thereof. The voids in the dielectric plates are staggered or offset with respect to each other except at the centers of the plates where the voids are aligned to facilitate the passage of an assembly member. The plates are then subject to pressure molding to secure the aligned position.

The Luneberg lens system described by Albanese et al. includes a diode array whose pulsing modulates the effective cross section, and thus the strength of the returned signal. In accordance with the present invention, a second set of reflecting elements can be placed at a radius from the diode array approximately 1/4 wavelength greater than the radius of the first set. If the reflectivities of the two shells of reflecting elements are alternately pulsed in accordance with the invention as above, the Luneberg lens system will operate in binary phase-shift key mode (BPSK) mode to provide up to 6 dB of improvement in the SNR. A particular advantage of this so-modified system is its insensitivity to the direction of the incident signal over nearly $2\pi$ steradians of solid angle.

A Luneberg lens having a plurality of reflector elements disposed thereon can be used, in accordance with another embodiment of the present invention, as a reflector Tag to increase the interrogation range in an RF Tag monitoring system. The Luneberg lens will receive and reflect RF signals of a wavelength ($\lambda$) and a time period (T). This is accomplished by positioning the plurality of reflecting elements along an axis in a direction of expected receipt of the RF signals and spacing the reflecting elements such that adjacent elements are separated by a spacing of approximately $\lambda 2/N$. Some or all of the reflecting elements are then sequentially selected for activation (one at a time) for a duration of time of approximately T/N so that a time approximately equal to the time period (T) is required for activating the selected elements.

This arrangement in accordance with the present invention may also be applied to a version of the Luneberg lens in which a sphere is bisected and the resulting flat surface is made reflective. In that so-modified version, the Luneberg lens can function over nearly $\pi$ steradians of solid angle.

MODULATION

Many modulation techniques are available for conveying information that the RF-Tag needs to report. Commonly assigned pending U.S. patent application Ser. No. 08/777, 771, filed on Dec. 31, 1996 and incorporated herein by reference, lists a number of modulation schemes, including phase shift keying (PSK) of the subcarrier $$\sin\left(\frac{2\pi t}{T}\right).$$

This list includes BPSK, QPSK, and more complex modulation schemes (e.g., MSK, GMSK, etc.) These modulation techniques are generally sufficient for use with an RF Tag system implemented in accordance with the present invention.

While there have been shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A method of increasing an interrogation range in an RF-Tag monitoring system having an Interrogator and a plurality of reflecting antenna elements located on each of one or more tags for receiving RF signals of a wavelength ($\lambda$) and a time period T from the Interrogator and reflecting back to the Interrogator modulated signals, wherein said plurality of reflecting antenna elements are spatially positioned along a path of activation, said method comprising the step of: activating at least some of the reflecting antenna elements in said plurality along said path of activation for a duration of time so that a presently activated reflecting antenna element is positioned farther along the path of activation with respect to a previously activated reflecting antenna element.

2. The method set forth in claim 1, wherein said activating step comprises the step of sequentially activating at least some of the reflecting antenna elements in said plurality.

3. The method set forth in claim 1, wherein said activating step comprises activating at least some of the reflecting antenna elements for a duration of time so that an average activation time for each activated antenna element is T/N, where N is the number of activated antenna elements.

4. The method set forth in claim 1, wherein said plurality of reflecting antenna elements are located on one RF Tag.

5. The method set forth in claim 1, wherein said plurality of reflecting antenna elements are positioned about an axis at an average separation of $\lambda/2N$, where N is the number of activated antenna elements.

6. The method set forth in claim 5, wherein said axis comprises a plurality of axes so that a group of reflecting antenna elements are positioned along each of said axes.

7. The method set forth in claim 6, further comprising the step of simultaneously activating the reflective antenna elements in each axially aligned group and measuring the strength of the reflected signal from said activated group to determine which axially aligned group provides a strong reflected signal.

8. The method set forth in claim 7, wherein each axially aligned group of reflective antenna elements has a length that is increased by adding additional reflective antenna elements.

9. The method set forth in claim 1, wherein said reflecting antenna elements are positioned in a staggered arrangement about an axis at an average separation of $\lambda/2N$, where N is the number of activated antenna elements.

10. The method set forth in claim 1, wherein said activating step further comprises activating said at least some of the reflecting antenna elements so that only one reflecting antenna element is activated at any given time.

11. A method for increasing an interrogation range in an RF Tag monitoring system utilizing a Luneberg lens reflector as an RF Tag for receiving and reflecting RF signals, the Luneberg lens having a plurality of reflecting elements for receiving RF signals of a wavelength ($\lambda$) and a time period T and for reflecting modulated signals derived from the received RF signals, wherein said plurality of reflecting elements are positioned along a path of activation, said method comprising the step of: activating at least some of the reflecting elements in the plurality along said path of activation for a duration of time so that a presently activated antenna element is positioned farther along the path of activation with respect to a previously activated reflecting antenna element.

12. The method set forth in claim 11, wherein said step of activating generates a phase difference between the signals reflected from the plurality of reflecting elements.

13. An RF Tag communication system, comprising:
   an Interrogator for transmitting RF signals having a carrier wavelength ($\lambda$) and a period (T);
   a plurality of reflecting antenna elements located on each of one or more tags for receiving RF signals of the wavelength ($\lambda$) and the time period T from the Interrogator and reflecting back to the Interrogator modulated signals, said plurality of reflecting antenna elements being spatially positioned along a path of activation; and
   means for activating at least some of the reflecting antenna elements in said plurality along said path of activation for a duration of time so that a presently activated reflecting antenna element is positioned farther along the path of activation with respect to a previously activated reflecting antenna element.

14. The system of claim 13, wherein said activating means comprises means for sequentially activating at least some of the reflecting antenna elements in said plurality.

15. The system of claim 13, wherein said activating means comprises activating at least some of the reflecting antenna elements for a duration of time so that an average activation time for each activated antenna element is T/N, where N is the number of activated antenna elements.

16. The RF Tag communication system in accordance with claim 13, wherein the plurality of reflecting antenna elements are disposed on a single RF Tag.

17. The RF Tag communication system in accordance with claim 13, wherein said activating means comprises a processor.

18. The RF Tag communication system in accordance with claim 13, wherein said plurality of reflecting antenna elements is positioned so that the antenna elements are axially aligned with each other in a direction of expected incident receipt of the RF interrogating signals.

19. The RF Tag communication system in accordance with claim 13, wherein said reflecting antenna elements are positioned about an axis at an average separation of $\lambda/2N$, where N is the number of activated antenna elements.

20. The RF Tag communication system in accordance with claim 19, wherein said axis comprises a plurality of axes so that a group of reflecting antenna elements are positioned along each of said axes.

21. The RF Tag communication system in accordance with claim 20, wherein said activating means is operable to simultaneously activate the reflective antenna elements in each axially aligned group so that the strength of the reflected signal from each said activated group can be evaluated to determine which axially aligned group provides a strong reflected signal.

22. The RF Tag communication system in accordance with claim 13, wherein said reflecting antenna elements are positioned in a staggered arrangement about an axis at an average separation of $\lambda/2N$, where N is the number of activated antenna elements.

23. A reflective communicator for receiving a signal from an Interrogator and reflecting the received signal back to the Interrogator, said reflective communicator comprising:

a plurality of reflective antenna elements disposed along a direction of activation; and means for activating at least some of the reflective antenna elements in said plurality along said path of activation so that a presently activated reflecting antenna element is positioned farther along the path of activation with respect to a previously activated reflecting antenna element.

24. The communicator of claim 23, wherein said activating means comprises means for sequentially activating at least some of the reflecting antenna elements in said plurality.

25. The communicator is accordance with claim 23, wherein the signal from the Interrogator has a wavelength and a period T and wherein said activating means comprises activating at least some of the reflecting antenna elements for a duration of time so that an average activation time for each activated antenna element is T/N, where N is the number of activated antenna elements.

26. The communicator in accordance with claim 23, wherein the plurality of reflecting antenna elements are disposed on a single RF Tag.

27. A method of compensating for misalignment between an interrogation signal produced by an interrogator and a reflecting element array comprising a plurality of reflecting antenna elements by activating selected numbers of the plural reflecting antenna elements during a series of predetermined activation time periods T, comprising the steps of:

(a) activating a selected number of the plural reflecting antenna elements during an activation time period T to receive and reflect the interrogation signal back to the interrogator;

(b) measuring the strength of the reflected interrogation signal from step (a);

(c) repeating each of steps (a) and (b) for subsequent activation time periods T using different selected numbers of the plural antenna elements; and (d) using the measured strengths of the reflected interrogation signals from said repeated steps (b) to determined a desired number of the plural antenna elements to be activated to produce a desired strength reflected signal.

* * * * *